United States Patent
Montemurro et al.

(10) Patent No.: US 10,405,167 B2
(45) Date of Patent: Sep. 3, 2019

(54) NOTIFICATION OF DISCOVERY ACTIVITIES

(71) Applicant: BlackBerry Limited, Waterloo (CA)

(72) Inventors: Michael Peter Montemurro, Toronto (CA); Lucas Dobrowolski, Thornhill (CA); Konrad Hammel, Waterloo (CA); Stephen McCann, Southampton (GB); James Randolph Winter Lepp, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 87 days.

(21) Appl. No.: 15/263,856

(22) Filed: Sep. 13, 2016

(65) Prior Publication Data
US 2018/0077555 A1    Mar. 15, 2018

(51) Int. Cl.
| | | |
|---|---|---|
| *H04W 8/00* | (2009.01) | |
| *H04W 12/12* | (2009.01) | |
| *H04W 12/02* | (2009.01) | |
| *H04W 48/16* | (2009.01) | |
| *H04W 24/08* | (2009.01) | |

(52) U.S. Cl.
CPC ........... *H04W 8/005* (2013.01); *H04W 12/02* (2013.01); *H04W 24/08* (2013.01); *H04W 48/16* (2013.01); *H04W 12/12* (2013.01)

(58) Field of Classification Search
CPC .............................. H04W 8/005; H04W 42/08
USPC .................................................. 455/436–443
See application file for complete search history.

(56) References Cited

U.S. PATENT DOCUMENTS

| | | | |
|---|---|---|---|
| 6,295,452 B1 * | 9/2001 | Choi | H04W 36/12 370/331 |
| 8,730,915 B2 | 5/2014 | Cheng | |
| 8,837,423 B2 * | 9/2014 | Kim | H04W 36/02 370/331 |
| 2005/0272425 A1 * | 12/2005 | Amerga | H04B 1/70735 455/436 |
| 2007/0165875 A1 | 7/2007 | Rezvani | |
| 2008/0148381 A1 * | 6/2008 | Aaron | H04L 63/029 726/11 |
| 2010/0322213 A1 | 12/2010 | Liu | |
| 2011/0314512 A1 | 12/2011 | Sinha et al. | |
| 2013/0007853 A1 | 1/2013 | Gupta | |
| 2015/0281236 A1 | 10/2015 | Batta et al. | |

OTHER PUBLICATIONS

European Patent Office, International Search Report and Written Opinion for PCT/EP2017/072193 dated Nov. 21, 2017 (15 pages).
Cisco—https://documentation.meraki.com/MR/WiFi_Basics_and_Best_Practices/802.11_Association_process_explained—802.11 Association process explained—Cisco Meraki downloaded Mar. 3, 2016 (2 pages).

(Continued)

*Primary Examiner* — Joshua L Schwartz
(74) *Attorney, Agent, or Firm* — Trop, Pruner & Hu, P.C.

(57) ABSTRACT

In some examples, a wireless device includes a wireless interface to communicate wirelessly with wireless networks, and at least one processor configured to monitor discovery activities for identifying services or devices of the wireless networks, and provide, to a target entity, a notification containing information relating to the monitored discovery activities.

21 Claims, 2 Drawing Sheets

(56) References Cited

OTHER PUBLICATIONS

Bahl et al., Microsoft Research, Reconsidering Wireless Systems with Multiple Radios, 2004 (8 pages).
Wikipedia, Generic Advertisement Service last modified Mar. 2, 2015 (3 pages).
Wikipedia, MIMO last modified Mar. 2, 2016 (24 pages).
Wikipedia, Near-me area network modified Apr. 27, 2015 (4 pages).
Wikipedia, Network detector modified Jul. 17, 2015 (3 pages).
Eng Hwee Ong, 2012 IEEE 23rd International Symposium on Personal, Indoor and Mobile Radio Communications—(PIMRC), Performance Analysis of Fast Initial Link Setup for IEEE 802.11ai WLANs, 2012 (6 pages).
http://whatis.techtarget.com/definition/Access-Network-Query-Protocol-ANQP—What is Access Network Query Protocol (ANQP)?—Definition from WhatIs.com downloaded Mar. 3, 2016 (18 pages).
Wi-Fi Alliance, Wi-Fi Aware to bring proximity-based service discovery to Wi-Fi Certified devices later this year, Devices will be aware of nearby services before connecting, Jan. 16, 2015 (3 pages).
Camps-Mur et al., Enabling always on service discovery: Wi-Fi Neighbor Awareness Networking (NAN), 2015 (8 pages).
Montemurro et al., U.S. Appl. No. 15/136,196 entitled Wireless Network Discovery Using a MIMO Transceiver filed Apr. 22, 2016 (22 pages).

\* cited by examiner

NOTIFICATION OF DISCOVERY ACTIVITIES

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

BRIEF DESCRIPTION OF THE DRAWINGS

Some implementations of the present disclosure are described with respect to the following figures.

DETAILED DESCRIPTION

Figure 1:
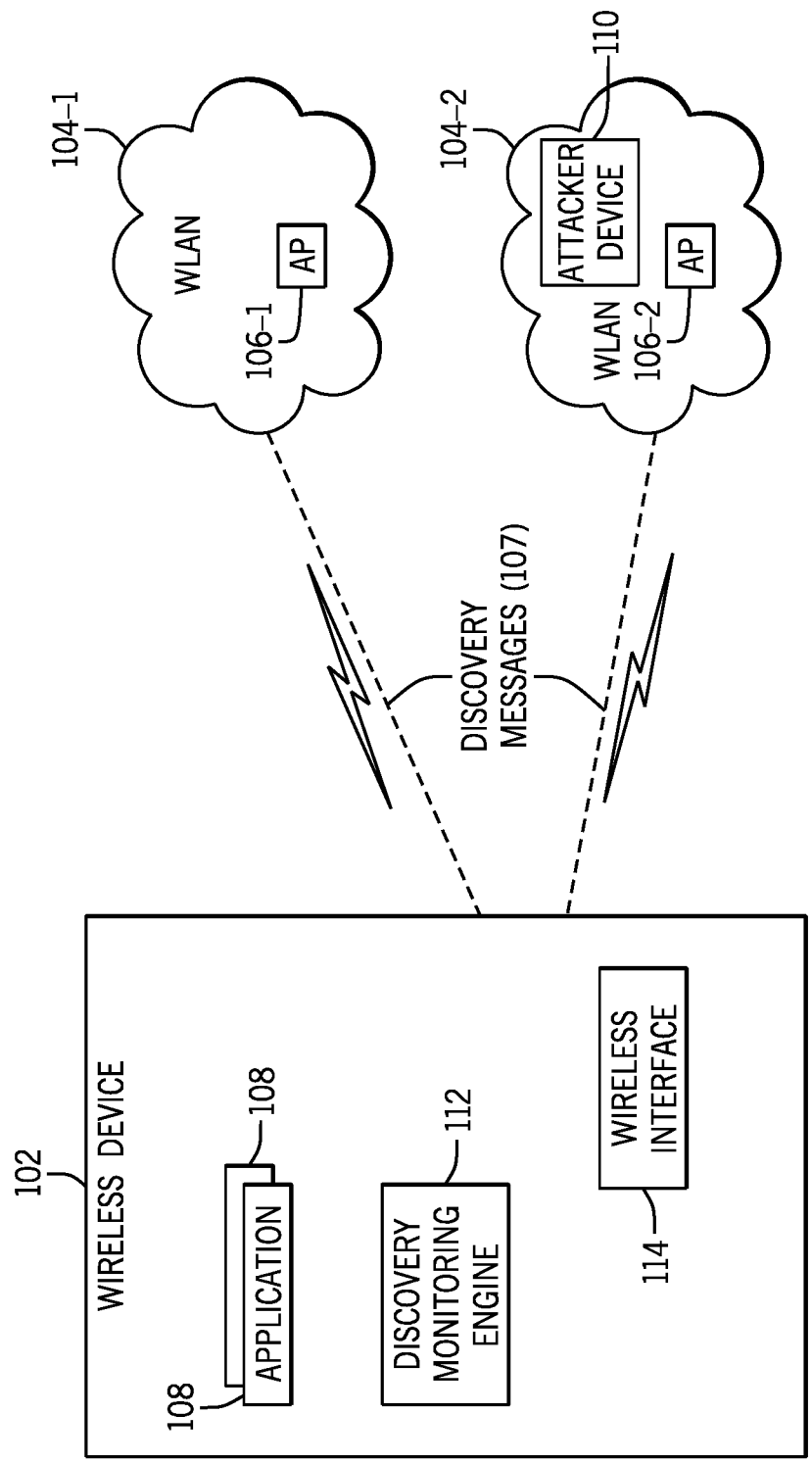
FIG. 1 is a block diagram of an example arrangement that includes a wireless device and wireless networks, according to some implementations.

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications. In other examples, WLANs can operate according to other protocols. More generally, techniques or mechanisms according to some implementations of the present disclosure can be used with other types of wireless networks, such as cellular networks or other wireless networks. In a cellular network, an AP can refer to a wireless access network node, such as a base station or enhanced node B (eNodeB) in a cellular network that operates according to the Long-Term Evolution (LTE) standards as provided by the Third Generation Partnership Project (3GPP). The LTE standards are also referred to as the Evolved Universal Terrestrial Radio Access (E-UTRA) standards.

Examples of wireless devices include computers (e.g., tablet computers, notebook computers, desktop computers, etc.), handheld devices (e.g. smart phones, personal digital assistants, etc.), wearable devices (smart watches, electronic eyeglasses, head-worn devices, etc.), game appliances, health monitors, vehicles (or equipment in vehicles), or other types of endpoint or user devices that are able to communicate wirelessly. More generally, a wireless device can refer to an electronic device that is able to communicate wirelessly.

A wireless device can perform discovery activities to identify available services or devices of wireless networks. Identifying available services or devices of wireless networks can include identifying information relating to the services or devices. Examples of information relating to devices of wireless networks can include any or some combination of the following: information about the wireless networks, information about APs, information about operators of APs, information about endpoint or user devices in the wireless networks, and so forth. Examples of information about services offered by wireless networks can include any or some combination of the following: information of specific service providers accessible through an AP, information about a cellular network accessible through an AP, information about capabilities of an AP, information about an authentication type used to perform authentication, information about an Internet Protocol (IP) address version or type that can be allocated, information about metrics of a connection between an AP and an external network (e.g., the Internet), information about communication protocols and ports of an AP, and so forth.

In the ensuing discussion, reference is made to performing discovery activities for services or devices of WLANs. However, techniques or mechanisms according to some implementations can be applied to discovery activities relating to other types of wireless networks.

In some examples, a discovery activity of a wireless device includes scanning for WLANs, where the scanning can include active scanning or passive scanning. Active scanning can refer to a wireless device sending a scan command, such as in the form of a Probe Request to locate an AP of a WLAN. Passive scanning can refer to a wireless device listening to advertisements from an AP, such as in the form of a Probe Response or Beacon, without the wireless device first sending any scan commands.

In other examples, other types of discovery activities can be performed. Such other discovery activities can involve sending queries according to other protocols, such as a Generic Advertisement Service (GAS) query, an Access Network Query Protocol (ANQP) request, a Wi-Fi Direct protocol, a Neighbor Awareness Networking (NAN) query, a Fast Initial Link Setup (FILS) query, or other queries, together with the receiving of the corresponding responses in response to the queries.

In some examples, GAS is a protocol provided by IEEE 802.11, and provides over-the-air transportation for frames of higher-layer advertisements between WLAN stations (STAs) (such as the wireless device) or between a server in an external network and a WLAN station. The purpose of GAS is to enable a station to send a GAS query to identify the availability of information related to network services or devices of a wireless network, while the station is in a pre-associated or unassociated state. GAS defines a generic container to advertise network services information over an IEEE 802.11 network.

In further examples, the wireless device is able to send an ANQP request, which is a form of query, to an AP of a wireless network. In response to the ANQP request, the AP can send to the wireless device information elements that describe the services or devices available at the wireless network. The wireless device can use ANQP to obtain such information without having to associate with the wireless network, e.g., while the wireless device is in a pre-associated or unassociated state.

Another type of discovery activity can relate to discovery performed according to Wi-Fi Direct, which provides a mechanism for a peer-to-peer (P2P) network built on top of an IEEE 802.11 WLAN protocols. Wi-Fi Direct is also referred to as "Wi-Fi P2P," which is specified by standards provided by the Wi-Fi Alliance. An arrangement of wireless devices that are able to communicate according to Wi-Fi Direct includes a P2P Group Owner (GO) and P2P client devices. In terms of behavior at Layers 1 to 3, the GO operates as an AP, while the client devices operate as non-AP STAs. The differences between Wi-Fi Direct operations and regular IEEE 802.11/Wi-Fi operations include discovery and group formation procedures. Once a Wi-Fi Direct group is formed and operating, the operation of the Wi-Fi Direct group is similar to operation according to IEEE 802.11 in which a traditional fixed AP is used.

NAN relates to a network that can be established among wireless devices that are in close proximity. A NAN query can be sent by the wireless device to discover other NAN devices or services of a wireless network.

An FILS query can be sent by the wireless device to establish a wireless connection with a wireless network within a relatively short time duration, e.g., 100 milliseconds. FILS allows for discovery by the wireless device of an AP of a wireless network to allow for establishment of a wireless link.

Discovery activities performed by a wireless device can cause certain information relating to the wireless device to be exposed. Such information can correspond to Personally Identifying Information (PII) or Personal Correlated Information (PCI) since information about the device is information about the user of the device. For example, location information of the wireless device can be exposed, since the detection of messages transmitted by the wireless device during discovery activities can allow for an entity that is monitoring a WLAN to determine the approximate location of the wireless device. Such an entity can be an electronic device of a passive attacker that wishes to determine wireless devices within the vicinity of the attacker.

Another issue associated with discovery activities of a wireless device is that certain third party applications that may run on the wireless device may attempt to initiate discovery activities of the wireless device to collect information or PII relating to the wireless device, such as the location of a wireless device. The third party application may then attempt to send such location information back to a developer of the third party application, an advertisement network affiliated with the application, or some other entity that is external of the wireless device.

In addition to the possibility of exposing information of a wireless device due to discovery activities, it is noted that discovery activities can also cause increased power consumption at the wireless device that can deplete a battery of the wireless device.

In accordance with some implementations of the present disclosure, a mechanism can be added to a wireless device to monitor discovery activities that may be initiated by an application executing in the wireless device. An application can refer generally to any program including machine-readable instructions that can be loaded in the wireless device. For example, a user may download an application to the wireless device. Alternatively, the wireless device can be pre-loaded with an application.

FIG. 1 is a block diagram of an example arrangement that includes a wireless device 102 and multiple WLANs 104-1 and 104-2. The WLAN 104-1 includes an AP 106-1, and the WLAN 104-2 includes an AP 106-2. Although just one AP is shown as being part of each WLAN, it is noted that in other examples, multiple APs can be included in a WLAN. Moreover, even though just two WLANs are depicted in FIG. 1, it is noted that in other examples, more than two WLANs or just one WLAN may be in the communication range of the wireless device 102.

The wireless device 102 includes a number of applications 108 that can execute in the wireless device 102. One or more of these applications 108 can perform discovery activities to identify services or devices of WLANs that are within the communication range of the wireless device 102, such as the WLANs 104-1 and 104-2. The discovery activities can cause discovery messages 107 to be communicated between the wireless device 102 and one or more of the APs 106-1 and 106-2 in the WLANs 104-1 and 104-2, respectively. A discovery message can refer to any message that is communicated between the wireless device 102 and a WLAN (or other type of wireless network) as part of a discovery activity, where the discovery message can include a request sent by the wireless device 102, or a response sent by the wireless device 102 in response to a request from a WLAN (or other type of wireless network. The discovery message can refer to an entire message or an information element within a message.

As noted above, a passive attacker device 110 can be present in a communication range of at least one of the WLANs 104-1 and 104-2, such as the passive attacker device 110 that is in the communication range of the WLAN 104-2. Note that the passive attacker device 110 may or may not be associated with the WLAN 104-2. The passive attacker device 110 is able to operate on a channel of the WLAN 104-2, such that the passive attacker device 110 is able to receive communications of other devices on the channel. The passive attacker device 110 can monitor the wireless communication medium between the wireless device 102 and the WLAN 104-2, and can detect discovery messages that are exchanged between the wireless device 102 and the WLAN 104-2.

In other examples, a particular application 108 may collect information of the wireless device 102 based on discovery activities initiated by the particular application 108, so that the particular application 108 can communicate the information (such as the location of the wireless device 102, PII, PCI, or other information) to a remote entity, such as the developer of the particular application 108 or some other entity.

In accordance with some implementations of the present disclosure, a discovery monitoring engine 112 can be provided in the wireless device 102 to monitor discovery activities of the wireless device 102. The discovery monitoring engine 112 can be implemented with a hardware processing circuit, or as a combination of machine-readable instructions executable on the hardware processing circuit.

The discovery monitoring engine 112 can provide, to a target entity, a notification containing information relating to the monitored discovery activities. The target entity can be an entity that resides in the wireless device 102, or an entity that is external of the wireless device. For example, the target entity can include a user interface to present the notification (where the user interface is displayed in a display of the wireless device 102), an operating system in the wireless device 102, a designated application in the wireless device 102, an application programming interface (API), or any other entity in the wireless device 102. Sending a notification to the API can cause the notification to be sent or forwarded to another entity, whether inside the wireless device 102 or external of the wireless device 102.

An external target entity can include a mobile device management (MDM) service that is used for administering wireless devices. For example, an MDM service can be used to ensure that users of wireless devices stay productive and are not breaching corporate policies. An MDM service can also perform configuration of wireless devices. In other examples, the discovery monitoring engine 112 is able to send a notification containing information relating to monitored discovery activities to another type of external entity, such as a remote server.

The wireless device 102 includes a wireless interface 114 to communicate wirelessly with other devices, such as the APs 106-1 and 106-2. The wireless interface 114 can include a wireless transceiver, such as a radio frequency (RF) transceiver, to transmit and receive wireless signals. Although not shown, the wireless device 102 can also include protocol layers to allow the wireless device 102 to communicate according to respective protocols over a wireless link through the wireless interface 114.

Figure 2:
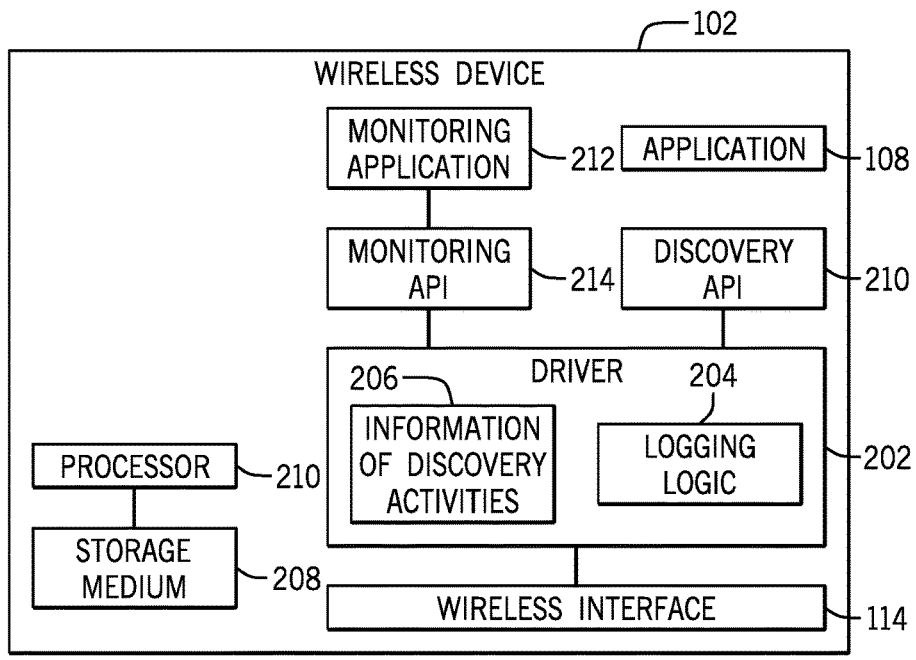
FIG. 2 is a block diagram of components in a wireless device according to some implementations.

FIG. 2 is a block diagram of an example wireless device 102 according to further implementations. The wireless device 102 includes a driver 202 for the wireless interface 114. The driver 202, which can be implemented as machine-readable instructions, is an interface between programs in the wireless device 102 and the hardware of the wireless interface 114. In accordance with some implementations of the present disclosure, the driver 202 includes logging logic 204 that can be used to log information 206 of discovery activities performed by the wireless device 102. The logged information 206 of discovery activities can be stored in the wireless device 102, such as in a storage medium 208 in the wireless device 102.

Logged information of a discovery activity can include any one or more of the following: information of a discovery message (such as a discovery query or discovery response) that was transmitted by the wireless device 102, as part of the discovery activity, a time of the discovery activity, such as the start time and/or the completion time of a discovery activity, a location of the discovery activity, a channel list (which lists one or more channels of a wireless link used in the discovery activity), a network address, such as a Medium Access Control (MAC) address or Internet Protocol (IP) address, information identifying the type of discovery activity (e.g., active scan, passive scan, GAS discovery, ANQP discovery, Wi-Fi Direct discovery, NAN discovery, FILS discovery, etc.), and so forth.

In some examples, the logged information of a discovery activity can also include information identifying the application 108 that initiated the discovery activity. The information identifying the application 108 can include a name of the application 108, or any other information that can be used to derive an identity of the application 108. The information identifying the application 108 that initiated the discovery activity can be used to determine whether an application that is not authorized or that should not be initiating discovery activities is causing such discovery activities to occur.

The wireless device 102 can also include a discovery application programming interface (API) 210, which includes routines that can be invoked by an application 108 to perform a discovery activity through the wireless interface 114. For example, the application 108 can invoke a routine in the discovery API 210 to transmit a discovery message (such as a discovery request) through the driver 202 and the wireless interface 114 and then receive any corresponding replies.

Discovery messages passed through the driver 202 are logged by the logging logic 204 of the driver 202 to provide the logged information 206 of discovery activities.

The wireless device 102 can also include a monitoring application 212 and a monitoring API 214. The monitoring application 212 and the monitoring API 214 can be part of the discovery monitoring engine 112 of FIG. 1. The monitoring API 214 includes routines that can be invoked by the monitoring application 212 to subscribe to events of the driver 202, including events relating to discovery activities. For example, the monitoring application 212 can use the monitoring API 214 to subscribe to events relating to logged discovery activities, so that the driver 202 can send the information of logged discovery activities to the monitoring application 212.

The wireless device 102 further includes a processor 216 (or multiple processors). Machine-readable instructions are executable on the processor(s) 216, including machine-readable instructions of the monitoring application 212, the monitoring API 214, the driver 202, the application 108, and the discovery API 210. A processor can include a microprocessor, a core of a multi-core microprocessor, a microcontroller, a programmable integrated circuit, a programmable gate array, or another hardware processing circuit.

Figure 3:
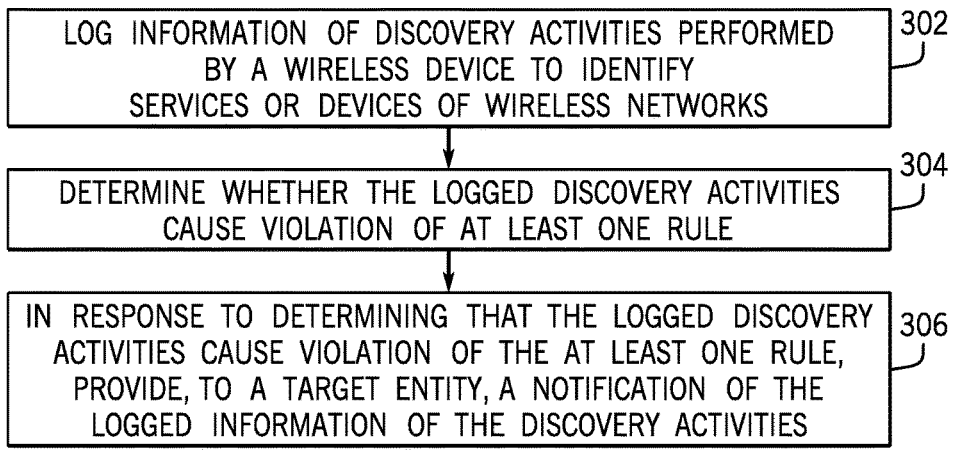
FIGS. 3 and 4 are flow diagrams of example processes according to various implementations.

FIG. 3 is a flow diagram of an example process that can be performed by the wireless device 102, in accordance with some implementations. The process includes logging (at 302) information of discovery activities performed by the wireless device to identify services or devices of wireless networks. In some examples, the logging can be performed by the driver 202 of FIG. 2. The discovery activities that can be monitored can include one type of discovery activities (e.g., active scans by the wireless device 102) or multiple different types of discovery activities (e.g., active scans, passive scans, GAS discovery, ANQP discovery, Wi-Fi Direct discovery, NAN discovery, FILS discovery, etc.).

The process further includes determining (at 304) whether the logged discovery activities cause violation of at least one rule or policy. Note that in some examples, the terms "rule" and "policy" are used interchangeably. In other examples, a policy can include one or more rules. The at least one rule can include one or more of the following: a threshold relating to a number or rate of discovery activities, a threshold relating to power consumption, a threshold relating to a battery level, a rule relating to whether or not specific applications are allowed to initiate discovery activities, or any combination of the foregoing.

Thus, for example, a violation of the at least one rule is indicated in response to detecting that the number of discovery activities (e.g., number of discovery messages sent by the wireless device 102) exceeds the discovery activity threshold. As another example, a violation of the at least one rule is indicated in response to detecting that power consumption of the wireless device 102 that may be caused by discovery activities exceeds the power consumption threshold. As a further example, a violation of the at least one rule is indicated in response to detecting that a level of the battery in the wireless device 102 has fallen below the battery level threshold. As yet a further example, a violation of the at least one rule is indicated in response to detecting that an application that triggered a discovery activity should not have done so (e.g., the application is identified as one which does not normally trigger a discovery activity by the wireless device 102).

In response to determining that the logged discovery activities cause violation of the at least one rule, the process further includes providing (at 306), to a target entity, a notification of the logged information of the discovery activities. As discussed above, the target entity can be located in the wireless device 102, or can be external of the wireless device 102.

Tasks 304 and 306 can be performed by the monitoring application 212 in some examples.

In some examples, the logged information of discovery activities can be filtered by a third party application (an application in the wireless device 102 that has triggered discovery activities) or by monitoring service (e.g., an MDM service). The filtering can cause only logged information of discovery activities for a specific third party application (of multiple third party applications) or for a specific monitoring service (of multiple monitoring services) to be analyzed for rule violation and potential notification.

In examples where there are multiple target entities that may be interested in receiving notifications of logged discovery activities, then respective different monitoring policies can be specified for the multiple target entities. For example, there can be multiple MDM services, or one or more MDM services and one or more internal target entities in the wireless device 102. Each of the different monitoring policies can include respective rule(s) governing whether there is a violation caused by the monitored discovery activities.

Figure 4:
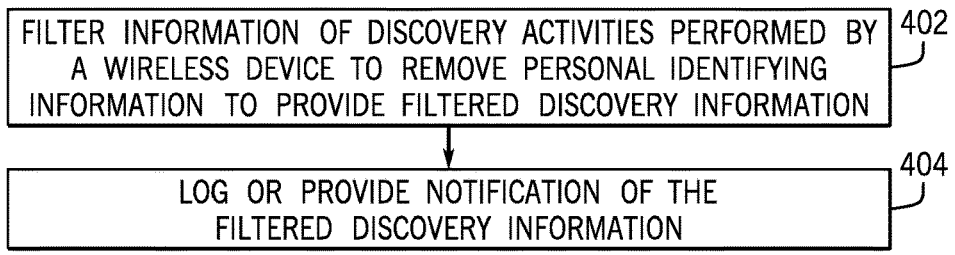

FIG. 4 is a flow diagram of an example process according to further implementations. The process of FIG. 4 includes filtering (at 402) information of discovery activities performed by the wireless device 102 to remove personal identifying information to produce filtered discovery information (which can include a subset of the information of the discovery activities). The filtering can be applied by the logging logic 204 (FIG. 2), or alternatively, the filtering can be applied by the monitoring application 212 (FIG. 2), in some examples.

An example of the personal identifying information that is filtered (deleted, scrambled, encrypted, or otherwise rendered un-decipherable or inaccessible) is a personal service set identifier (SSID). In other examples, personal identifying information such as a network address (e.g., MAC address or IP address) or a username can be filtered. More generally, "personal identifying information" can refer to any information that can be used to derive an identity of the wireless device 102 or the user of the wireless device 102.

The process includes logging or providing notification (at 404) of the filtered discovery information. In examples where the filtering is applied by the logging logic 204, then the logged information 206 (FIG. 2) of discovery activities includes the filtered discovery information. Since the logged information 206 includes the filtered discovery information, the notification that is sent to a target entity would also include the filtered discovery information. In other examples, the logged information 206 of discovery activities is not filtered, but instead, the monitoring application 212 can perform the filtering such that the notification that is provided to a target entity includes the filtered discovery information.

In further examples, filtering of personal identifying information can involve scrambling a network address, such as a MAC address or IP address. The scrambling involves translating network addresses in messages of the discovery activities to translated network addresses. The translating can be performed by the logging logic 204 (FIG. 2) or the monitoring application 212 (FIG. 2), in some examples. The translating can be performed by using an address translation table, which translates between real network addresses and translated network addresses.

In such examples, the logging performed by the logging logic 204 can involve logging of the translated network addresses rather than the real network addresses, or the notification provided to the target entity includes the translated network addresses but not the real network addresses.

A storage medium (e.g., storage medium 208 in FIG. 2) for storing machine-readable instructions can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A wireless device comprising:
a wireless interface to communicate wirelessly with wireless networks; and
at least one processor configured to:
monitor discovery activities for identifying services or devices of the wireless networks, the discovery activities comprising a discovery message transmitted by the wireless device to a wireless network of the wireless networks;
determine whether the discovery activities cause violation of at least one rule; and
responsive to determining that the discovery activities cause violation of the at least one rule, provide, to a target entity, a notification containing information relating to the monitored discovery activities, the information contained in the notification comprising information in the discovery message transmitted by the wireless device as part of the discovery activities.

2. The wireless device of claim 1, wherein the discovery activities comprise scanning for the services or devices of the wireless networks.

3. The wireless device of claim 1, wherein the discovery activities comprise Generic Advertisement Service (GAS) activities, Access Network Query Protocol (ANQP) activities, Wi-Fi Direct activities, Neighbor Awareness Networking (NAN) activities, and Fast Initial Link Setup (FILS) activities.

4. The wireless device of claim 1, wherein the target entity to which the notification is provided comprises one or more of a user interface to present the notification, an operating system in the wireless device, an application program in the wireless device, an application programming interface (API), and a remote entity external of the wireless device and accessible over a network.

5. The wireless device of claim 1, wherein the at least one processor is configured to log the information relating to the discovery activities along with information identifying an application that initiated the discovery activities.

6. The wireless device of claim 1, wherein the information of the discovery message included in the notification comprises information of the discovery message transmitted by the wireless interface to identify the services or devices of the wireless networks.

7. The wireless device of claim 1, wherein the at least one rule comprises one or more of a threshold relating to power consumption, or a threshold relating to a battery level.

8. The wireless device of claim 1, wherein the monitoring of the discovery activities comprises monitoring different types of discovery activities.

9. The wireless device of claim 1, wherein the at least one processor is configured to:
filter information of the discovery activities to remove personal identifying information to produce filtered discovery information,
wherein the notification provided to the target entity comprises the filtered discovery information.

10. The wireless device of claim 1, wherein the at least one processor is configured to:
translate network addresses in the message of the discovery activities to translated network addresses,
wherein the notification provided to the target entity comprises the translated network addresses but not the network addresses.

11. The wireless device of claim 1, further comprising:
a driver to log the information relating to the discovery activities; and
machine-readable instructions executable on the at least one processor to receive the information logged by the driver.

12. The wireless device of claim 11, further comprising an application programming interface, the machine-readable instructions executable on the at least one processor to use the application programming interface to subscribe to events corresponding to the discovery activities.

13. A wireless device comprising:
a wireless interface to communicate wirelessly with wireless networks; and
at least one processor configured to:
monitor discovery activities for identifying services or devices of the wireless networks;
determine whether the discovery activities cause violation of at least one rule; and
responsive to determining the violation of the at least one rule, provide, to a target entity, a notification containing information relating to the monitored discovery activities, the information contained in the notification comprising information in a message transmitted by the wireless device as part of the discovery activities, wherein the information contained in the notification further comprises information identifying a type of the discovery activities, the information identifying the type of the discovery activities selected from among information identifying an active scan, information identifying a passive scan, information identifying a Generic Advertisement Service (GAS) discovery, information identifying an Access Network Query Protocol (ANQP) discovery, information identifying a Wi-Fi Direct discovery, information identifying a Neighbor Awareness Networking (NAN) discovery, and information identifying a Fast Initial Link Setup (FILS) discovery.

14. The wireless device of claim 1, wherein the information contained in the notification further comprises a location of the discovery activities.

15. The wireless device of claim 1, wherein the information contained in the notification further comprises information identifying an application that initiated the discovery activities.

16. A method performed by a wireless device, comprising:
monitoring discovery activities for identifying services or devices of wireless networks;
determining whether the discovery activities cause violation of at least one rule; and
responsive to determining the violation of the at least one rule, providing, to a target entity, a notification containing information relating to the monitored discovery activities, the information contained in the notification comprising information in a message transmitted by the wireless device as part of the discovery activities, wherein the information contained in the notification further comprises information identifying a type of the discovery activities, the information identifying the type of the discovery activities selected from among information identifying an active scan, information identifying a passive scan, information identifying a Generic Advertisement Service (GAS) discovery, information identifying an Access Network Query Protocol (ANQP) discovery, information identifying a Wi-Fi Direct discovery, information identifying a Neighbor Awareness Networking (NAN) discovery, and information identifying a Fast Initial Link Setup (FILS) discovery.

17. The method of claim 16, wherein providing the notification responsive to determining the violation of the at least one rule comprises providing the notification responsive to determining that the discovery activities caused the wireless device to consume power that exceeds a power consumption threshold.

18. The method of claim 16, wherein providing the notification responsive to determining the violation of the at least one rule comprises providing the notification responsive to determining that a level of a battery of the wireless device has fallen below a battery level threshold.

19. The method of claim 16, wherein providing the notification responsive to determining the violation of the at least one rule comprises providing the notification responsive to determining that an application that triggered the discovery activities should not have triggered the discovery activities.

20. The method of claim 16, wherein the information contained in the notification further comprises a location of the discovery activities.

21. A non-transitory machine-readable storage medium storing instructions that upon execution cause a wireless device to:
monitor discovery activities for identifying services or devices of wireless networks, the discovery activities comprising a discovery message transmitted by the wireless device to a wireless network of the wireless networks;
determine whether the discovery activities cause violation of at least one rule; and
responsive to determining that the discovery activities cause violation of the at least one rule, provide, to a target entity, a notification containing information relating to the monitored discovery activities, the information contained in the notification comprising information in the discovery message transmitted by the wireless device as part of the discovery activities.

* * * * *